United States Patent
Hux et al.

(10) Patent No.: US 7,027,059 B2
(45) Date of Patent: Apr. 11, 2006

(54) DYNAMICALLY CONSTRUCTED RASTERIZERS

(75) Inventors: William A. Hux, Portland, OR (US); Stephen Junkins, Bend, OR (US)

(73) Assignee: Intel Corporation, Santa Clara, CA (US)

( * ) Notice: Subject to any disclaimer, the term of this patent is extended or adjusted under 35 U.S.C. 154(b) by 253 days.

(21) Appl. No.: 10/161,008

(22) Filed: May 30, 2002

(65) Prior Publication Data

US 2003/0227461 A1     Dec. 11, 2003

(51) Int. Cl.
*G06F 12/02*     (2006.01)

(52) U.S. Cl. .................. 345/543; 345/419; 345/421; 345/426; 345/582

(58) Field of Classification Search ............... 345/533, 345/530, 543, 418, 426, 419, 422, 428, 421, 345/582
See application file for complete search history.

(56) References Cited

U.S. PATENT DOCUMENTS 5,841,444 A  *  11/1998  Mun et al. .................. 345/506
6,657,624 B1 *  12/2003  Olano ......................... 345/426

OTHER PUBLICATIONS

"A Characterization of Ten Rasterization Techniques", Nader Gharachorloo, Robert Sproull, "Computer Graphics", vol. 23, No. 3, Jul. 1989.*

* cited by examiner

*Primary Examiner*—Matthew C. Bella
*Assistant Examiner*—Hau Nguyen
(74) *Attorney, Agent, or Firm*—Steven P. Skabrat (57) ABSTRACT

Dynamically constructing a scan line rasterizer in a rasterization engine includes selecting a base rasterizer, obtaining parameters describing the base rasterizer, obtaining at least one replacement block of code, allocating memory for a dynamically constructed rasterizer, copying the base rasterizer into the memory allocated for the dynamically constructed rasterizer, and copying the at least one replacement block into the base rasterizer stored in the memory using the parameters to form the dynamically constructed rasterizer.

18 Claims, 4 Drawing Sheets

Figure 1

| | |
|---|---|
| BASE RASTERIZER 1 | RASTER PARAMETERS |
| BASE RASTERIZER 2 | RASTER PARAMETERS |
| BASE RASTERIZER 3 | RASTER PARAMETERS |
| ⋮ | ⋮ |
| BASE RASTERIZER N | RASTER PARAMETERS |

DYNAMICALLY CONSTRUCTED RASTERIZERS

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

1. Field

The present invention relates generally to three-dimensional (3D) computer graphics and, more specifically, to scan line rasterizers in a 3D graphics pipeline.

2. Description

A typical 3D graphics pipeline for a raster display system includes a front-end subsystem and a back-end subsystem. The front-end subsystem includes a transform and light engine, and the back-end subsystem includes a rasterization engine.

The transform and light engine accepts 3D scene geometry (e.g., polygons) specified in three space coordinates, light source parameters, and camera parameters as input parameters. The transform and light engine applies the camera transformations to the 3D scene geometry to produce two-dimensional (2-D) screen space projected polygons (typically triangles). The transform and light engine also applies the light source parameters to produce vertex colors for each vertex of the screen space projected polygons. These colors are usually stored in red-green-blue (RGB) format, typically with five or eight bits per channel.

The rasterization engine draws polygons on a display screen. Rasterization converts transformed primitives into pixel values, and generally stores them in a frame buffer for subsequent display. Rasterization typically includes three sub-tasks: scan conversion, visible-surface determination, and shading. Rasterization, in principle, requires calculating each primitive's contribution to each pixel on the screen. The rasterization engine accepts a list of 2D polygons in screen space coordinates and a list of 2D vertices with vertex attributes as input parameters. Vertex attributes may include 2D position, Z depth, RGB vertex color (from lighting computation or user input), 2D texture coordinates, and optionally a per vertex alpha value. The alpha value is typically an eight-bit value stored with the RGB color values to form a 32-bit aligned data word for each pixel.

Scan conversion for a rasterization engine consists of two phases: triangle setup and scan line rasterization. Triangle setup computes starting points, ending points, and per pixel delta offsets for every scan line in a triangle of the scene. A per pixel delta offset needs to be computed for each attribute that is to be interpolated by the scan line rasterizer. Interpolated attributes may include x position, z depth, texture coordinates, fragment material color, and fragment alpha color. Scan line rasterizers render each scan line of a triangle. This requires applying the interpolated attributes to each pixel on the scan line and, based on specified rasterization parameters, performing the correct per pixel color computation to compute each pixel's color.

For best performance, a different scan line rasterizer should be optimally coded for each possible rasterization state. A rasterization state is a specific combination of interpolated attributes. There may be hundreds, or even thousands, of rasterization states depending on the number of supported attributes. A considerable amount of storage space would be needed to support such a variety of scan line rasterizers optimized for specific rasterization states. This is potentially wasteful since a given 3D application is unlikely to need more than a handful (e.g., 3–10) specific rasterizers (the degree of need is content dependent). In computing platforms having particular form factors (such as handheld computers for example), memory for storing rasterizers may be limited. Additionally, coding large numbers of rasterizers is burdensome, and some platforms may not have floating point computational capability.

BRIEF DESCRIPTION OF THE DRAWINGS

The features and advantages of the present invention will become apparent from the following detailed description of the present invention in which.

DETAILED DESCRIPTION

An embodiment of the present invention is a system and method for dynamically constructing a rasterizer depending on the current rasterization state needed for processing by a graphics pipeline. The present invention uses a set of base rasterizers (useful only for a small subset of the possible rasterization states) and one or more of a set of replacement blocks of rasterization code to construct a larger set of dynamically customized rasterizers covering all possible states (or at least the states needed to render a given scene). The base rasterizers may be used "as is" for common rasterization states, and also may be used as code templates to be customized based on specified raster parameters and replacement blocks.

Reference in the specification to "one embodiment" or "an embodiment" of the present invention means that a particular feature, structure or characteristic described in connection with the embodiment is included in at least one embodiment of the present invention. Thus, the appearances of the phrase "in one embodiment" appearing in various places throughout the specification are not necessarily all referring to the same embodiment.

A 3D computer graphics application typically sets a number of state variables indicating functions to be performed on polygons, such as triangles, comprising objects within a scene. In one embodiment, the triangles are configured into triangle meshes as is known in the art. Examples of state variables include a depth buffer test (e.g., less than, less than or equal to, equal to, greater than, greater than or equal to, always, and never), a texture mode (e.g., no texture, modulate, add, replace, etc.), a texture type (e.g., 16 bits per pixel, 24 bits per pixel, compressed, alpha component, etc.), and alpha blending (e.g., a number of combinations of source and destination colors). State variables other than the above examples may also be employed. The variable may provide an indication of transformations to be performed on scene data.

Figure 1:
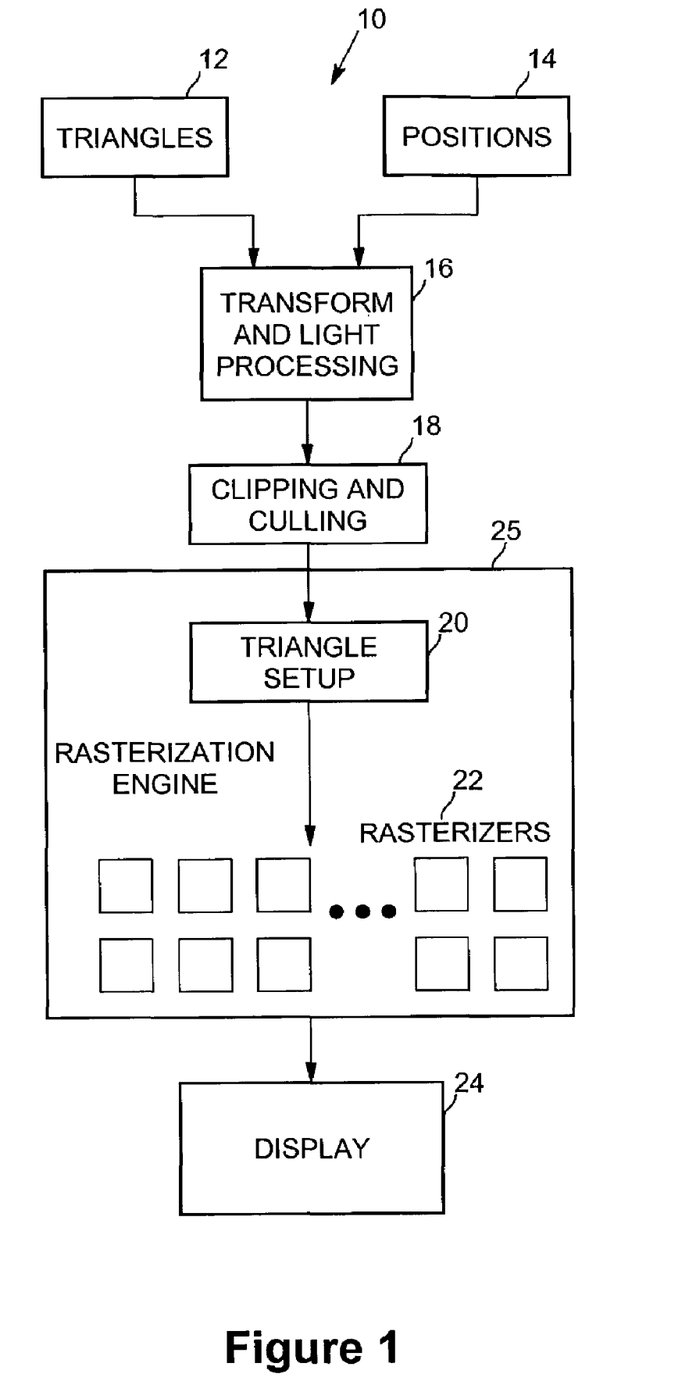
FIG. 1 is a diagram of a graphics pipeline according to an embodiment of the present invention.

A 3D computer graphics application may use a graphics pipeline 10 such as is shown in FIG. 1. Triangles 12 and positions 14 data may be input to transform and light processing function 16. Transform and light processing function applies camera transformations to the 3D scene geometry represented by the triangles and positions to produce 2-D screen space projected triangles. The transform and light engine also applies the light source parameters to produce vertex colors for each vertex of the screen space projected triangles. The screen space projected triangles may be input to culling and clipping function 18. The culling and clipping function culls and clips the triangles according to a current view frustrum. Triangles wholly or partially visible may be input to triangle setup function 20. The triangle setup function calls selected rasterizers 22, one per horizontal scan line for each triangle. Each called rasterizer causes the display of scan line data on display 24. A rasterizer comprises an algorithm that linearly interpolates values using forward differencing. The rasterizer may comprise a portion of code that accepts as input a pointer to a color buffer, a number of pixels to draw, and attributes such as a set of starting values, and a set of ending values, and interpolates values in between. The attributes may also include color, texture coordinates, depth values, alpha values, and so on. The rasterizer outputs pixel data having color values resulting from the specified attributes. In one embodiment, a base rasterizer may be approximately 50 to 100 lines of assembly code.

Figure 2:
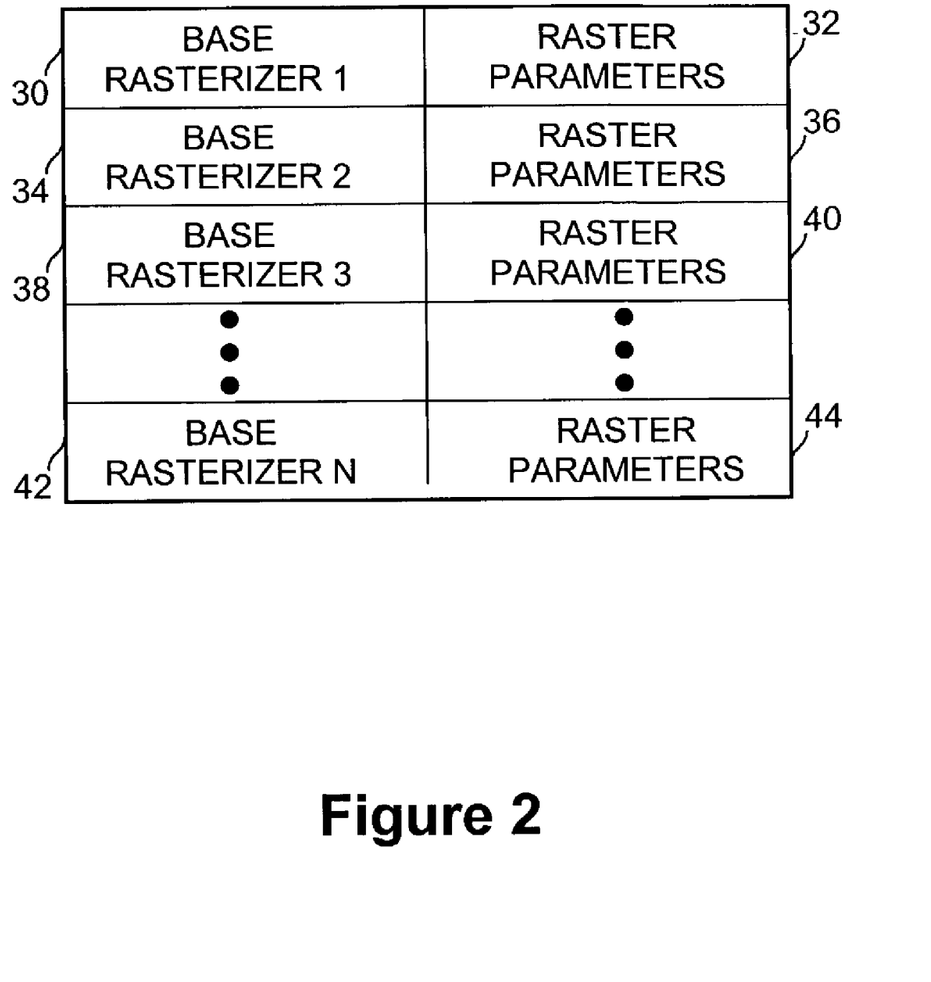
FIG. 2 is a diagram illustrating base rasterizers and raster parameters according to an embodiment of the present invention.

According to embodiments of the present invention, multiple rasterizers 22 may be included within a rasterization engine 25. In at least one embodiment, a plurality of optimized base rasterizers may be included. An optimized base rasterizer may be customized according to a set of raster parameters and zero or more replacement blocks. FIG. 2 is a diagram illustrating base rasterizers and raster parameters according to an embodiment of the present invention. Multiple base rasterizers and corresponding sets of raster parameters, such as base rasterizer 1 30 and raster parameters 32, base rasterizer 2 34 and raster parameters 36, base rasterizer 3 38 and raster parameters 40, and so on through base rasterizer N 42 and raster parameters 44, may be specified in a rasterization engine. According to embodiments of the present invention, any number of base rasterizers and associated raster parameters may be included in a rasterization engine.

Base rasterizers may be coded optimally for common and distinct rasterization states to provide the highest possible performance for typical usage in the graphics pipeline. In one embodiment, a base rasterizer may be coded in an assembly language. In one embodiment, various base rasterizers may be included in the rasterization engine, such as flat shading (F), smooth shading (S), textured (T), flat shading with depth (z) test (FZ), smooth shading with depth (z) test (SZ), textured with depth (z) test (TZ), flat shading with modulated texture (FT), smooth shading with modulated texture (ST), flat shading with modulated texture with depth (z) test (FTZ), smooth shading with modulated texture with depth (z) test (STZ), and so on. Other base rasterizers for other rasterization states may also be used.

One illustrative, non-limiting example of a base rasterizer is shown in Table I. This base rasterizer provides the function of a flat shaded, single textured rasterizer. In this example, there are two points in the code where replacement blocks may be inserted.

TABLE I

```
© 2002 Intel Corporation
E3DSL_FT
    ;--------REGISTER ALLOCATION------------------------
    ;R0 - startPt           [x, w, r, g, b, a, u, v]
    ;R1 - endPt             [x, w, r, g, b, a, u, v]
    ;R2 - pRasterParams
    ;-----------------------------------------------------
    STMFD    sp!, {R4 - R11, lr}
    LDR      R5, [R0]
    LDR      R6, [R1]
    LDR      R4, = REGISTER_OVERFLOW_BUFFER
    MOV      lr,    R6, LSR #16              ;Floor StartX and EndX
    SUBS     lr, lr, R5, LSR #16             ;lr = Resolution: |x2 - x1|
    STR      R2, [R4, #24]                   ;pRasterParams
    BLE      E3DSL_FT_LoadRGBUV
E3DSL_FT_ComputeGradients
    ;--------REGISTER ALLOCATION------------------------
    ;R0 - startPt           [x, w, r, g, b, a, u, v]
    ;R1 - endPt             [x, w, r, g, b, a, u, v]
    ;R2 - pRasterParams
    ;R4 -REGISTER_OVERFLOW_BUFFER
    ;lr - Resolution
    ;REGISTER_OVERFLOW_BUFFER - [X|X|X|X|X|X|pRaster_Params|X]
    ;-----------------------------------------------------
    LDR      R5, = INV_LOOKUP_TABLE_LOWRES
    ADD      R5, R5, lr, LSL #2
    LDR      R6, [R5, #-4]                   ;R6 = (1/lr) >> 16
    LDR      R3, [R0, #24]
    LDR      R5, [R1, #24]
    SUB      R5, R5, R3
    SMULL    R8, R9, R5, R6
    STR      R9, [R4, #16]                   ;dU
    LDR      R3, [R0, #28]
    LDR      R5, [R1, #28]
    SUB      R5, R5, R3
    SMULL    R8, R9, R5, R6
    STR      R9, [R4, #20]                   ;dV
    SUB      lr, lr, #1                      ;Do not draw Last Pixel
```

TABLE I-continued

```
E3DSL_FT_LoadRGBUV
    ;--------REGISTER ALLOCATION-----------------------
    ;R0 - startPt
    ;R1 - endPt
    ;R2 - pRasterParams
    ;R4 - REGISTER_OVERFLOW_BUFFER
    ;lr - Resolution
    ;REGISTER_OVERFLOW_BUFFER - [X|X|X|X|dU|dV|pRaster_Params|X]
    ;-----------------------------------------------------
    LDR         R10, [R2, #IPPG_RasterParam_Color_Offset]
                ;R10 - rrrr rrrr gggg gggg bbbb bbbb aaaa aaaa
    AND         R5, R10, #0xFF000000
                ;R5 - rrrr rrrr 0000 0000 0000 0000 0000 0000
    AND         R6, R10, #0x00FF0000
                ;R6 - 0000 0000 gggg gggg 0000 0000 0000 0000
    AND         R7, R10, #0x0000FF00
                ;R7 - 0000 0000 0000 0000 bbbb bbbb 0000 0000
    LDR         R10, [R0]
    LDR         R12, [R2, #IPPG_RasterParam_FrameBuffer_Offset]
    MOV         R3, R10, LSR #16                    ;x0
    LDR         R8, [R0, #24]                       ;u0
    LDR         R9, [R0, #28]                       ;v0
E3DSL_FT_BufferCalculation
;=============================================================
;*** Insert replacement block here to move buffer pointers to beginning of
;    triangle scanline
;=============================================================
    MOV         R5, R5, LSR #8
                ;R5 - 0000 0000 rrrr rrrr 0000 0000 0000 0000
    MOV         R7, R7, LSL #8
                ;R5 - 0000 0000 bbbb bbbb 0000 0000 0000 0000
    ;--------REGISTER ALLOCATION-----------------------
    ;R0 - pDisplayBuffer
    ;R1 -
    ;R2 - pRasterParams
    ;R4 - REGISTER_OVERFLOW_BUFFER
    ;R5 - r0
    ;R6 - g0
    ;R7 - b0
    ;R8 - u0
    ;R9 - v0
    ;lr - Resolution
    ;REGISTER_OVERFLOW_BUFFER - [X|X|X|X|dU|dV|pRaster_Params|X]
    ;-----------------------------------------------------
E3DSL_FT_ComputeNextPixel
;=============================================================
;***Insert replacement block here to modify 16-bit color value on R3
;=============================================================
E3DSL_FT_ColorWrite
    STRH        R3, [R0]                            ;Storing to displayBuf
E3DSL_FT_SkipPixel
    SUBS        lr, lr, #1                          ;Resolution--
    BMI         E3DSL_FT_Exit
    ADD         R0, R0, #2                          ;pDisplayBuf++
    LDR         R2, [R4, #24]                       ;pRasterParams
    LDR         R11, [R4,#16]                       ;dU
    LDR         R12, [R4, #20]                      ;dV
    ADD         R8, R8, R11                         ;u1 += dU
    ADD         R9, R9, R12                         ;v1 += dV
    B           E3DSL_FT_ComputeNextPixel
E3DSL_FT_Exit
    MOV         R0, #IPPG_ippStsNoErr               ;IPP_STATUS_OK
    LDMFD       sp!, {R4 – R11, pc}
E3DSL_FT_End
```

Raster parameters may comprise a data structure describing details about a base rasterizer. For example, raster parameters may include information such as the length of a base rasterization function, an offset into the base rasterizer code to a depth buffer test opcode, a number of opcodes used for a texture blend function, an offset into the base rasterizer code to the texture blend function, an offset into the base rasterizer code to a color buffer write opcode, and an offset into the base rasterizer code to a texel lookup (a texel is a pixel within a texture). Other raster parameters may also be used.

One illustrative, non-limiting example of raster parameters is shown in Table II. In this example, the mnemonic "DCD" means double constant value. The first parameter is a pointer to the base rasterizer. The second parameter is a length of the function specified in the base rasterizer. The third and fourth parameters specify insertion points into the base rasterizer code where replacement blocks are to be inserted.

TABLE II

```
© 2002 Intel Corporation
ippgRasterProps_E3DSL_FT
    DCD     E3DSL_FT
    DCD     (E3DSL_FT_End - E3DSL_FT) >> 2
    DCD     (E3DSL_FT_BufferCalculation - E3DSL_FT) >> 2
    DCD     (E3DSL_FT_ColorWrite - E3DSL_FT) >> 2
```

Replacement blocks comprise short segments of code that may be copied into a base rasterizer to change the functionality of the base rasterizer. In one embodiment, the replacement block may overwrite existing code within a base rasterizer. In other embodiments, replacement blocks are inserted into base rasterizers without overwriting existing code. The first element of a replacement block may be a number of opcodes, followed the opcodes themselves. In one embodiment, opcodes may include texture add (instead of modulate) for flat shading rasterizers, texture add (instead of modulate) for smooth shading rasterizers, alpha blend, and compressed texture texel lookup. Other replacement blocks may also be defined. Any number of replacement blocks may be used modify rasterizers according to embodiments of the present invention in a graphics pipeline.

One illustrative, non-limiting example of two replacement blocks is shown in Table III. In this example, the two replacement blocks may be inserted into the base rasterizer shown in Table I at points marked by the comment lines having a ★★★ marker, respectively, according to the raster parameters shown in Table II. In this example, the replacement blocks modify a color buffer and a texture add function.

TABLE III

```
© 2002 Intel Corporation
E3D_Color_Buffer16
    DCD     (E3D_Color_Buffer16_End-E3D_Color_Buffer16) >> 2 - 1
    ADD     R0, R12, R3, LSL #1                         ;pDisplayBuffer
    E3D_Color_Buffer16_End
;--------------------------------------------------------------------
;Registers for Texel lookup and texture blend
;R2: pRasterParams
;R3: incoming texel
;R8: u
;R9: v
;R10, R11, R12: scratch
;--------------------------------------------------------------------
E3D_TextureAdd_16
    DCD     (E3D_TextureAdd_16_End - E3D_TextureAdd_16) >> 2 - 1
    AND     R10, R3, #0xF800
            ;R10 - 0000 0000 0000 0000 rrrr r000 0000 0000
    MOV     R11, R5, LSR #16
            ;R11 - 0000 0000 0000 0000 0000 0000 rrrr rrrr
    MOV     R10, R10, LSR #8
            ;R10 - 0000 0000 0000 0000 0000 0000 rrrr r000
    ADD     R10, R10, R11                               ;(tR + r)
    CMP     R10, #0xFF
            ;R10 - 0000 0000 0000 0000 0000 0000 rrrr rrrr
    MOVGT   R10, #0xFF
            ;R10 - 0000 0000 0000 0000 0000 0000 rrrr rrrr
    AND     R10, R10, #0xF8
            ;R10 - 0000 0000 0000 0000 0000 0000 rrrr r000
;sacrifice a cycle here -- shift by immediate needs the result of the AND
    MOV     R12, R10, LSL #8
            ;R12 - 0000 0000 0000 0000 rrrr r000 0000 0000
    AND     R10, R3, #0x07E0
            ;R10 - 0000 0000 0000 0000 0000 0ggg ggg0 0000
    MOV     R11, R6, LSR #16
            ;R11 - 0000 0000 0000 0000 0000 0000 gggg gggg
    MOV     R10, R10, LSR #3
            ;R10 - 0000 0000 0000 0000 0000 0000 gggg gg00
    ADD     R10, R10, R11                               ;(tG + g)
    CMP     R10, #0xFF
            ;R10 - 0000 0000 0000 0000 0000 0000 gggg gggg
    MOVGT   R10, #0xFF
            ;R10 - 0000 0000 0000 0000 0000 0000 gggg gggg
    AND     R10, R10, #0xFC
            ;R11 - 0000 0000 0000 0000 0000 0000 gggg gg00
;sacrifice a cycle here -- shift by immediate needs the result of the AND
    ORR     R12, R12, R10, LSL #3
            ;R12 - 0000 0000 0000 0000 rrrr rggg ggg0 0000
    AND     R10, R3, #0x001F
            ;R10 - 0000 0000 0000 0000 0000 0000 000b bbbb
    MOV     R11, R7, LSR #16
            ;R11 - 0000 0000 0000 0000 0000 0000 bbbb bbbb
    MOV     R10, R10, LSL #3
            ;R10 - 0000 0000 0000 0000 0000 0000 bbbb b000
```

TABLE III-continued

```
ADD        R10, R10, R11                              ;(tR + r)
CMP        R10, #0xFF
           ;R10 - 0000 0000 0000 0000 0000 0000 bbbb bbbb
MOVGT      R10, #0xFF
           ;R10 - 0000 0000 0000 0000 0000 0000 bbbb bbbb
ORR        R3,    R12, R10, LSR #3
           ;R3 - 0000 0000 0000 0000 rrrr rggg gggb bbbb
E3D_TextureAdd_16_End
```

Figure 3:
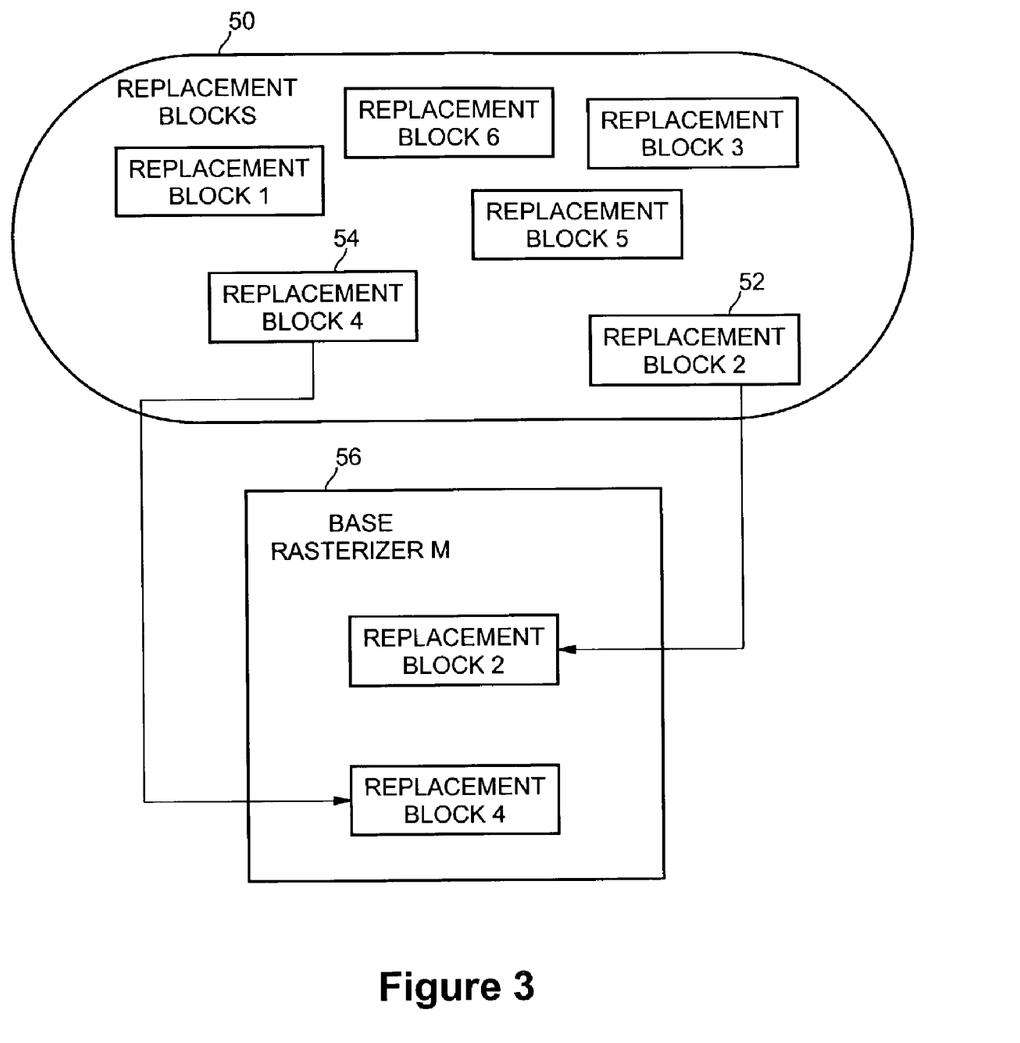
FIG. 3 is a diagram illustrating inserting replacement blocks into a base rasterizer according to an embodiment of the present invention.

FIG. 3 is a diagram illustrating inserting replacement blocks into a base rasterizer according to an embodiment of the present invention. A collection of replacement blocks 50 may include a plurality of individual replacement blocks. In one example, two replacement blocks, replacement block 2 52 and replacement block 4 54 may be inserted into base rasterizer M 56 at selected insertion points. Once a base rasterizer has been modified dynamically (e.g., during run-time) according to raster parameters and one or more replacement blocks, the rasterizer may be stored temporarily for subsequent use in processing the scene.

Figure 4:
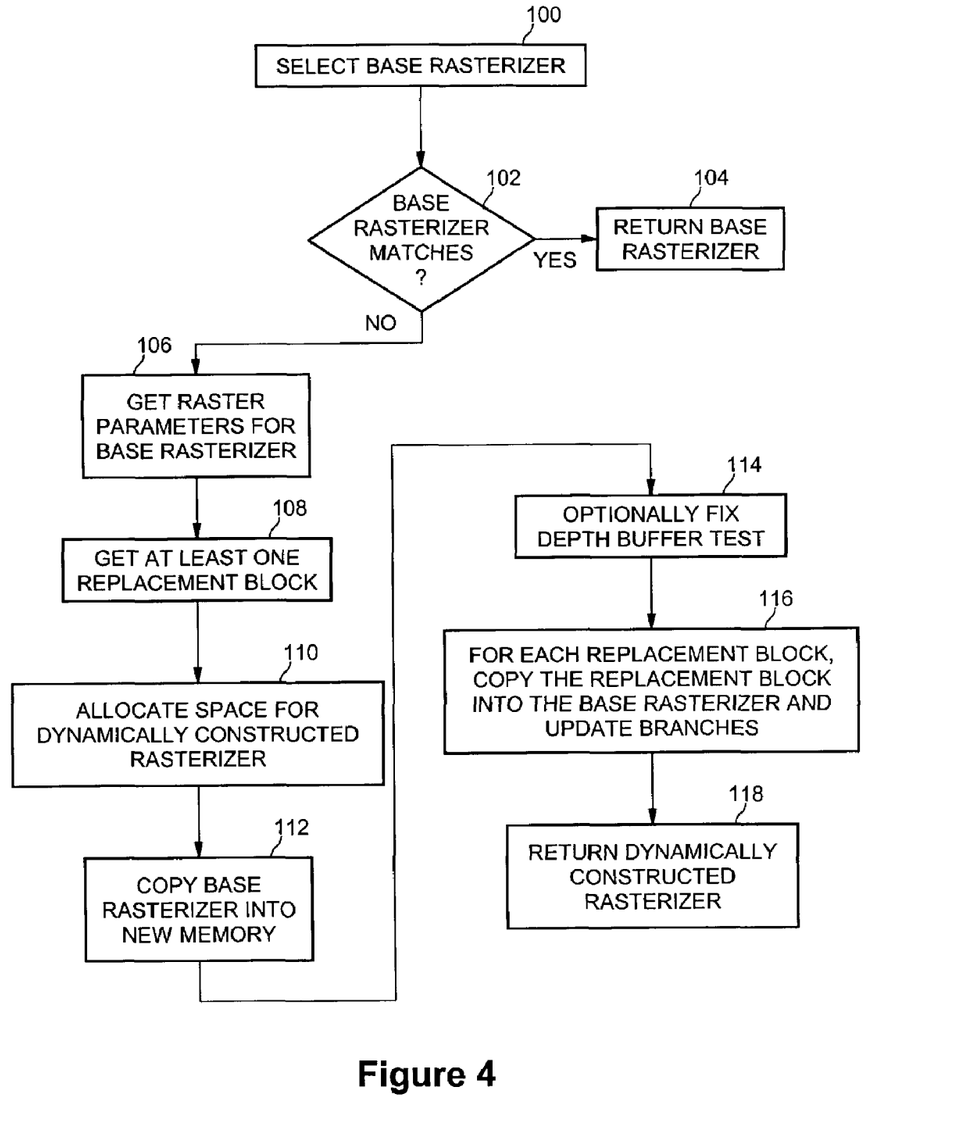
FIG. 4 is a flow diagram illustrating dynamic rasterizer generation according to an embodiment of the present invention.

FIG. 4 is a flow diagram illustrating dynamic rasterizer generation according to an embodiment of the present invention. At run-time, if the current rasterization state during graphics pipeline processing requires a rasterizer that does not sufficiently match a base rasterizer, a new rasterizer may be dynamically constructed by modifying a selected one of the base rasterizers according to raster parameters and one or more replacement blocks. At block 100, a base rasterizer may be selected (e.g., from a library or set of available base rasterizers). In one embodiment, a base rasterizer that is deemed to be most similar to the required functionality may be selected. If the base rasterizer matches the requirements for the current rasterization state at block 102, then the base rasterizer is returned at block 104 and used by the graphics pipeline. If the base rasterizer does not match, modifications to the base rasterizer may need to be made. Accordingly, processing continues at block 106, raster parameters associated with the selected base rasterizer may be obtained. At block 108, one or more replacement blocks may be obtained for use in a new dynamically constructed rasterizer. At block 110, space for the new dynamically constructed rasterizer may be allocated in any available memory. At block 112, the selected base rasterizer may be copied into the memory allocated for the new rasterizer.

At block 114, optionally, a depth buffer test may be "fixed" or modified. Generally, for each pixel on the screen, a depth buffer may be used to keep track of the distance between a viewpoint and an object occupying that pixel. If the specified depth test passes, an incoming depth value replaces the one already in the depth buffer. In embodiments of the present invention, the base rasterizers implement a default depth test (i.e., less than). This may be implemented as a branch statement that skips the color buffer write operation (the condition is converse, e.g., for "less than" the rasterizer branches if "greater than or equal to"). If a different depth test is required, the present invention replaces the branch appropriately. In some computing architectures (such as the commercially available ARM embedded reduced instruction set computing (RISC) processing architecture, for example), changing the depth buffer test merely requires changing the form of a single conditional test within a single opcode in the base rasterizer (e.g., from a branch-if-less-than (BLT) to a branch on some other condition (e.g., branch-if-greater-than (BGT))). This may be achieved using an array of bits, and replacing the bits within the opcode in the base rasterizer specified by the offset to the depth buffer test raster parameter. In this case, a replacement block may not be needed. In embodiments using the ARM RISC architecture, the first four bits of each opcode are used to check branch condition flags, so only four bits must be modified to change the depth test (one of less than, less than or equal to, equal to, greater than or equal to, or greater than).

At block 116, for each replacement block needed, the replacement block may be copied into the base rasterizer at a location selected by a raster parameter and branch instructions within the base rasterizer may be updated. After all replacement blocks have been copied and branches updated, the dynamically constructed rasterizer is complete. At block 118, the new dynamically constructed rasterizer may be returned for subsequent use in processing by the graphics pipeline.

To enable easy use of replacement blocks, in one embodiment, base rasterizers may be written using certain conventions. For example, base rasterizers may be written using the same hardware registers for the color to be written and the address of the color buffer. Similarly, base rasterizers may use the same registers for texel values and texture buffer addresses.

Embodiments of the present invention save space. In one embodiment, ten base rasterizers consume approximately 12 k bytes of memory. These ten rasterizers may be modified using replacement blocks (taking up another approximately 2 k bytes of memory) to generate 128 dynamically constructed rasterizers. Normally, the 128 rasterizers would require approximately 150 k bytes of memory. The code required to generate the rasterizers requires approximately 9 k bytes of memory. Hence, by dynamically constructing rasterizers according to embodiments of the present invention, approximately 150 k–23 k, or 127 k bytes may be saved (approximately 85%).

Embodiments of the present invention incur little or no performance cost. In some cases, the base rasterizer code generated may be as optimal as possible (e.g., changing the depth buffer comparison function or replacing texture modulation with addition). In the worse case (e.g., alpha blending), the performance penalty of using extra instructions may be offset by the inherent memory latency of the operation (e.g., reading and writing to the color buffer will limit performance of the rasterizer, such that a different (more optimal) implementation will offer no discernable performance change).

Embodiments of the present invention make it easy to add new rasterization features. Many features may be added by simply adding in a replacement block of code that implements a new feature. This new feature may leverage all of the existing scan line infrastructure code (of a base rasterizer) without re-implementing the code and without suffering a function call overhead penalty.

The techniques described herein are not limited to any particular hardware or software configuration; they may find applicability in any computing or processing environment. The techniques may be implemented in hardware, software, or a combination of the two. The techniques may be implemented in programs executing on programmable machines such as mobile or stationary computers, personal digital assistants, set top boxes, cellular telephones and pagers, and other electronic devices, that each include a processor, a storage medium readable by the processor (including volatile and non-volatile memory and/or storage elements), at least one input device, and one or more output devices. Program code is applied to the data entered using the input device to perform the functions described and to generate output information. The output information may be applied to one or more output devices. One of ordinary skill in the art may appreciate that the invention can be practiced with various computer system configurations, including multi-processor systems, minicomputers, mainframe computers, and the like. The invention can also be practiced in distributed computing environments where tasks may be performed by remote processing devices that are linked through a communications network.

Each program may be implemented in a high level procedural or object oriented programming language to communicate with a processing system. However, programs may be implemented in assembly or machine language, if desired. In any case, the language may be compiled or interpreted.

Program instructions may be used to cause a general-purpose or special-purpose processing system that is programmed with the instructions to perform the operations described herein. Alternatively, the operations may be performed by specific hardware components that contain hard-wired logic for performing the operations, or by any combination of programmed computer components and custom hardware components. The methods described herein may be provided as a computer program product that may include a machine readable medium having stored thereon instructions that may be used to program a processing system or other electronic device to perform the methods. The term "machine readable medium" used herein shall include any medium that is capable of storing or encoding a sequence of instructions for execution by the machine and that cause the machine to perform any one of the methods described herein. The term "machine readable medium" shall accordingly include, but not be limited to, solid-state memories, optical and magnetic disks, and a carrier wave that encodes a data signal. Furthermore, it is common in the art to speak of software, in one form or another (e.g., program, procedure, process, application, module, logic, and so on) as taking an action or causing a result. Such expressions are merely a shorthand way of stating the execution of the software by a processing system cause the processor to perform an action of produce a result.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A method of dynamically constructing a rasterizer comprising:
   selecting a base rasterizer;
   obtaining parameters describing the base rasterizer;
   obtaining at least one replacement block of code;
   allocating memory for a dynamically constructed rasterizer;
   copying the base rasterizer into the memory allocated for the dynamically constructed rasterizer; and
   copying the at least one replacement block into the base rasterizer stored in the memory using the parameters to form the dynamically constructed rasterizer, the dynamically constructed rasterizer having a functionality different than the base rasterizer.

2. The method of claim 1, wherein the base rasterizer comprises rasterizer code for processing at least a portion of a scene for a selected rasterization state.

3. The method of claim 2, wherein selecting the base rasterizer comprises selecting the base rasterizer from a set of base rasterizers that is most similar to functionality required to process the scene portion.

4. The method of claim 1, wherein copying the at least one replacement block comprises copying the at least one replacement block without overwriting code in the selected base rasterizer.

5. The method of claim 1, further comprising modifying a depth buffer test within the base rasterizer stored in the memory.

6. The method of claim 1, further comprising updating branch instructions in the dynamically constructed rasterizer.

7. The method of claim 1, wherein selecting the base rasterizer, obtaining the parameters, obtaining the at least one replacement block, allocating memory, copying the base rasterizer, and copying the at least one replacement block is performed during run-time by a rasterization engine of a graphics pipeline.

8. The method of claim 1, wherein the at least one replacement block comprises code to change the functionality of the base rasterizer.

9. An article comprising: a machine accessible medium having content stored thereon, wherein when the content is accessed by a processor, the content provides for dynamically constructing a rasterizer by selecting a base rasterizer, obtaining parameters describing the base rasterizer, obtaining at least one replacement block of code, allocating memory for a dynamically constructed rasterizer, copying the base rasterizer into the memory allocated for the dynamically constructed rasterizer, and copying the at least one replacement block into the base rasterizer stored in the memory using the parameters to form the dynamically constructed rasterizer, the dynamically constructed rasterizer having a functionality different than the base rasterizer.

10. The article of claim 9, wherein the base rasterizer comprises rasterizer code for processing at least a portion of a scene for a selected rasterization state.

11. The article of claim 10, wherein content for selecting the base rasterizer comprises content for selecting the base rasterizer from a set of base rasterizers that is most similar to functionality required to process the scene portion.

12. The article of claim 10, wherein content for copying the at least one replacement block comprises content for copying the at least one replacement block without overwriting code in the selected base rasterizer.

13. The article of claim 10, further comprising content for modifying a depth buffer test within the base rasterizer stored in the memory.

14. The article of claim 10, further comprising content for updating branch instructions in the dynamically constructed rasterizer.

15. The article of claim 10, wherein the at least one replacement block comprises code to change the functionality of the base rasterizer.

16. A rasterization engine comprising:
   a plurality of base rasterizers;
   a plurality of sets of raster parameters, each set associated with a selected base rasterizer; and
   at least one replacement block of code to be copied into a selected one of the base rasterizers according to a selected set of raster parameters at run-time to form a dynamically constructed rasterizer, the dynamically constructed rasterizer having a functionality different than the base rasterizer.

17. The rasterization engine of claim 16, wherein the at least one replacement block of code changes the functionality of the selected base rasterizer after copying.

18. The rasterization engine of claim 16, wherein each of the base rasterizers comprises scan line rasterizer code for processing at least a portion of a scene for a selected rasterization state.

* * * * *